(12) United States Patent
Agrawal et al.

(10) Patent No.: US 11,509,493 B1
(45) Date of Patent: Nov. 22, 2022

(54) ELECTRONIC DEVICE THAT ENABLES HOST TOGGLING OF PRESENTERS FROM AMONG MULTIPLE REMOTE PARTICIPANTS IN A COMMUNICATION SESSION

(71) Applicant: MOTOROLA MOBILITY LLC, Wilmington, DE (US)

(72) Inventors: Amit Kumar Agrawal, Bangalore (IN); Olivier D Meirhaeghe, Lincolnshire, IL (US); Rahul B. Desai, Hoffman Estates, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/346,499

(22) Filed: Jun. 14, 2021

(51) Int. Cl.
| | |
|---|---|
| *H04L 12/18* | (2006.01) |
| *G06K 9/00* | (2022.01) |
| *G06V 40/20* | (2022.01) |
| *G06V 40/10* | (2022.01) |

(52) U.S. Cl.
CPC ........ *H04L 12/1822* (2013.01); *G06V 40/107* (2022.01); *G06V 40/28* (2022.01); *H04L 12/1818* (2013.01)

(58) Field of Classification Search
CPC . H04L 12/1822; H04L 12/1818; G06V 40/28; G06V 40/107
See application file for complete search history.

(56) References Cited

U.S. PATENT DOCUMENTS

| | | | | |
|---|---|---|---|---|
| 7,532,714 | B1 * | 5/2009 | Miller | H04N 7/15 379/202.01 |
| 7,617,457 | B2 * | 11/2009 | Kortum | H04M 3/56 715/755 |
| 8,739,045 | B2 * | 5/2014 | Pang | H04N 7/152 715/753 |
| 9,071,692 | B2 * | 6/2015 | Sanaullah | H04M 3/563 |
| 9,516,268 | B2 * | 12/2016 | Heda | H04N 7/147 |
| 11,082,465 | B1 | 8/2021 | Chavez | |
| 11,082,661 | B1 | 8/2021 | Pollefeys | |
| 2001/0054070 | A1 | 12/2001 | Savage, III | |
| 2014/0022332 | A1 | 1/2014 | Wang | |
| 2014/0071223 | A1 * | 3/2014 | Chatterjee | H04L 65/403 348/E7.083 |

(Continued)

*Primary Examiner* — Esther B. Henderson
*Assistant Examiner* — Nazia Naoreen
(74) *Attorney, Agent, or Firm* — Isidore PLLC

(57) ABSTRACT

An electronic device, computer program product, and method enable hosting a communication session with customizable roles for participants that provides an adjustable balance of interaction and decorum. A controller configures the electronic device to identify, within an image stream from a next one of two or more second electronic devices that is not currently selected to present to a video communication session, at least one of a speaking movement of a mouth of a non-presenting participant or a gesture by the non-presenting participant to provide an audio input via the next second electronic device. In response to the identified speaking movement or the gesture, a host user interface of the electronic device presents an alert and enables host toggling of a selected one of the electronic device and the two or more second electronic devices to present a corresponding audio and video stream to the video communication session.

20 Claims, 9 Drawing Sheets

(56) References Cited

U.S. PATENT DOCUMENTS

| | | | |
|---|---|---|---|
| 2014/0320584 A1 | 10/2014 | Kumar | |
| 2014/0379351 A1* | 12/2014 | Raniwala | G06V 40/20 |
| | | | 704/270 |
| 2016/0094355 A1* | 3/2016 | Waltermann | H04L 12/1822 |
| | | | 715/755 |
| 2016/0104094 A1 | 4/2016 | Yom-Tov | |
| 2016/0255126 A1* | 9/2016 | Sarris | H04L 65/1096 |
| | | | 348/14.08 |
| 2016/0381720 A1 | 12/2016 | Baek | |
| 2018/0358034 A1* | 12/2018 | Chakra | G10L 25/78 |
| 2018/0376108 A1* | 12/2018 | Bright-Thomas | G06K 9/6274 |
| 2020/0110572 A1 | 4/2020 | Lenke | |
| 2020/0178045 A1 | 6/2020 | Sung | |
| 2021/0005098 A1* | 1/2021 | Davis | G06Q 10/06393 |
| 2021/0014074 A1* | 1/2021 | Dhawan | H04L 65/403 |
| 2021/0014455 A1 | 1/2021 | Gomy | |
| 2021/0201935 A1 | 7/2021 | Seethaler | |
| 2022/0191257 A1* | 6/2022 | Aceron | G06F 3/04842 |

\* cited by examiner

ELECTRONIC DEVICE THAT ENABLES HOST TOGGLING OF PRESENTERS FROM AMONG MULTIPLE REMOTE PARTICIPANTS IN A COMMUNICATION SESSION

BACKGROUND

1. Technical Field

The present disclosure relates generally to electronic devices that support/enable video communication sessions using a camera and a microphone, and more particularly to electronic devices that support/enable video communication sessions and having a microphone that can be muted and unmuted during the communication session.

2. Description of the Related Art

User communication devices such as mobile phones, desktop workstations, laptops, and tablets are often equipped with a front side camera and a microphone to enable online human communication. For privacy and other reasons, a local participant can turn off the front side camera. To avoid unintentional interruptions to other participants due to ambient noise, feedback, etc., the local participant can mute the microphone. Although muting has benefits, the muted microphone results in a degradation to the user experience when the local participant does seek to speak to the other participants but fails/forgets to unmute the microphone. When the camera of the local participant is turned off, the other participants may not even know that the local participant wants to speak or has started speaking. Even if the camera is on, other participants may not have the image stream of the local participant presented on their respective second electronic device. The appropriate time during the communication session for the remote participant to speak may be irrecoverably missed. For example, the current speaker or presenter may pause or expressly ask if there are any questions. When the remote participant's attempt to speak is not noticed, the communication session continues with the attempt by the remote participant to speak being overlooked by the other participants.

Video communication sessions are increasingly set up for a large number of participants that each use an electronic device. Conventionally the participants have to follow guidelines to participate appropriately, or the host needs to mute the participants to prevent interruptions. A network server in combination with a communication device used by a host participant have some control over who provides screen sharing to the other participants. The host participant has some ability to "soft mute" the electronic devices used by some of the participants while other participants are allowed to speak. In this way, conventional video conference systems can be utilized to replicate a seminar, a panel discussion, an organizational meeting, and other formats. Those participants whose electronic devices are soft muted have to find and use a control to indicate "hand raised" when seeking to speak to the other participants. Participants who are soft muted can find it difficult to use this hand raising control of the user interface or forget to activate the control, missing the opportunity to speak at an appropriate time in a discussion. Participants can also locally "hard mute" a microphone of their electronic device to prevent noise from interrupting the video conference system. The participant can forget that the microphone is muted. In large video conference sessions, these attempts to speak may go unnoticed by a host who is managing the session. Conventional host user interfaces used by the host participant to manage muting and unmuting participants during the video conference session do not mitigate these situations in which other participants seek to speak while their device is muted and who do not use the hand raising control.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
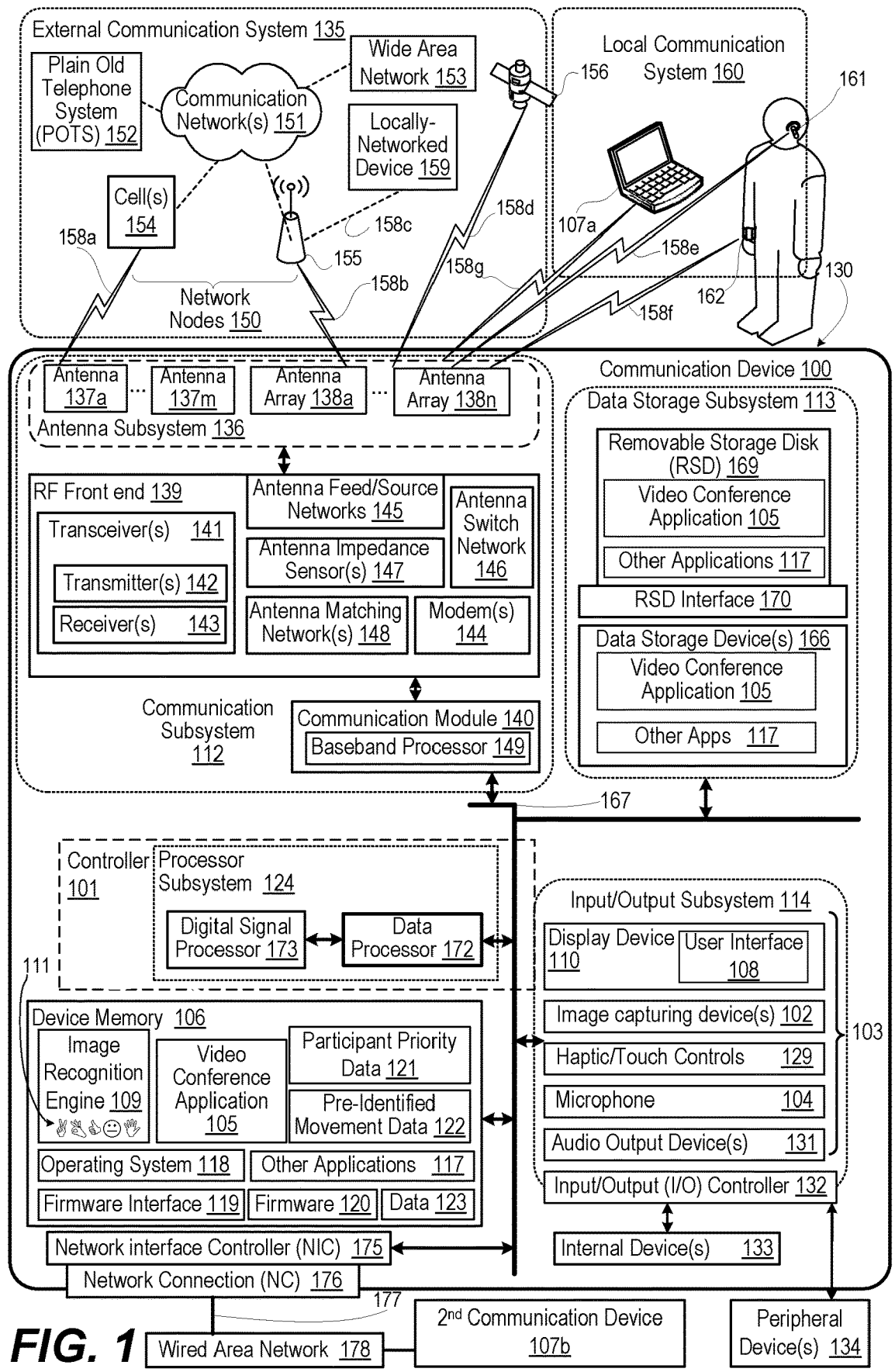
FIG. 1 depicts a functional block diagram of a communication environment of a communication device having a host user interface that is responsive to remote participants attempting to speak while their respective device is muted to reduce loss of communication between participants in a video communication session, and within which the features of the present disclosure are advantageously implemented, according to one or more embodiments.

According to aspects of the present disclosure, an electronic device, computer program product, and method enable managing a video communication session by a controller presenting a host user interface that is responsive to remote participants attempting to speak while their respective device is muted. A controller configures the electronic device to monitor audio and image streams provided respectively by second electronic devices that are communicatively connected to a host electronic device in a video communication session. At least one display device of the electronic device presents a host user interface that includes host controls for the video communication session between the electronic device and the second electronic devices. In response to a first user selection of a particular participant indicated within the host controls, the controller selects a particular audio and video stream from a particular second electronic device corresponding to the particular participant selected to present to the video communication session. The host user interface presents, in response to an identified movement of a non-presenting participant's mouth or a gesture captured within a video stream from the non-presenting participant, a new presenter toggle selector along with an alert via the host user interface that the non-presenting participant is attempting to speak to other participants in the video communication session. The controller enables host toggling, via the new presenter toggle selector from within the host user interface, of the non-presenting participant to become a presenting participant, the host toggling selecting an output of the video stream and a corresponding audio stream to present to the video communication session.

In one or more aspects of the present disclosure, the electronic device, computer program product, and method enable managing a video communication session via a host user interface to selectively soft mute participants to reduce or avoid interruptions to a presenting participant. To enable management of a large number of remote participants, the host user interface automatically monitors and responds to remote participants who attempt to speak while their device is soft muted or hard muted without using an established "hand raising" control. In particular, a host participant can enable one, a subset, or all of the remote participants to speak. To avoid confusion when multiple participants attempt to speak at the same time, the controller configures the electronic device to monitor image streams from at least some of the participants. In one or more embodiments, the image streams may or may not be accompanied with an active audio stream from the same source. In an example, the remote participant may be gesturing or mouthing words to get attention of the host participant without speaking aloud. However, the host participant may not have the image stream of the remote participant presented on the host user interface or may otherwise not notice the gesturing or the mouthing of words. In another example, the remote participant may be gesturing and speaking even though the host has soft muted the audio input from the remote participant and/or the remote participant has hard muted his/her microphone. In an additional example, the remote participant may be gesturing and speaking, oblivious to the fact that the microphone of the corresponding second electronic device was previously muted by the remote participant or by the host or presenter. In one or more embodiments, the controller can unmute a particular remote participant or alert the particular remote participant to unmute the corresponding second electronic device in response to visually detecting the attempt to speak.

In one or more aspects, the present disclosure provides for an improved user experience during a communication session between the electronic device and one or more second electronic devices by prioritizing when participants can speak. The communication session can be audio only or can include shared video from at least one of the electronic devices and the one or more second electronic devices.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device within an operating environment, and more particularly communication device 100 within which several of the features of the present disclosure are advantageously implemented. Communication device 100 is managed by controller 101, which is communicatively coupled to image capturing device 102 and to at least one user interface device 103 that includes at least one microphone 104 that allow a host participant using communication device 100 to be an active participant. Controller 101 is also communicatively coupled to at least one display device 110, which is an example user interface device 103. Controller 101 executes video conference application 105 stored in device memory 106 to configure communication device 100 to enable communication between participants in a video communication session. Communication device 100 is configured to autonomously provide notification(s) on user interface 108 of at least one display device 110 when a remote participant attempts to speak via a respective second electronic device 107a/107b that is at least one of hard muted and soft muted. It is appreciated that second electronic device 107a/107b can be similarly configured and/or provide similar functionality as communication device 100. Controller 101 presents user interface 108 that can be authenticated as having host credential to manage a video communication session as a host user interface. Content within user interface 108 is modified in response to controller detection of remote participants beginning to speak or attempting to speak while their respective device is muted. According to one or more embodiments, controller 101 monitors, during a communication session with one or more second communication devices 107a-107b, an image stream received from one or more second communication devices 107a-107b for specific movements and/or gestures by a remote participant in the communication session using image recognition engine 109. As an example, image recognition engine 109 can be a neural net that is trained to recognize anatomical features including facial features and hand movements. As another example, image recognition engine 109 can have a library of objects 111 that are used to compare to images. As an additional example, image recognition engine 109 can perform a two-dimensional correlation with library objects 111.

Each of communication device 100 and second communication devices 107a-107b can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100).

Referring to the specific component makeup and the associated functionality of communication device 100 of FIG. 1. In one or more embodiments, communication device 100 has device memory 106, communication subsystem 112, data storage subsystem 113, and input/output (I/O) subsystem 114. Device memory 106 and each subsystem (112, 113, and 114) are managed by controller 101. Device memory 106 includes program code for applications, such as video conference application 105, and other application(s) 117. Device memory 106 further includes operating system (OS) 118, firmware interface 119, such as basic input/output system (BIOS) or Uniform Extensible Firmware Interface (UEFI), and firmware 120. Device memory 106 includes participant priority data 121, pre-identified movement data 122 and other computer data 123 used by video conference application 105. Examples of participant priority data 121 include organizational hierarchy, assigned role in communication session, peer rating, and participation metrics. Examples of pre-identified movement data 122 can include dimensions of mouth opening and timing of mouth movements that continue for a minimum amount of time. Additional examples of pre-identified movement data 122 can include finger positioning and directions of movement of the fingers, the hand, or the arm.

Controller 101 includes processor subsystem 124 that executes program code to provide operating functionality of communication device 100. The software and/or firmware modules have varying functionality when their corresponding program code is executed by processor subsystem 124 or secondary processing devices within communication device 100. Processor subsystem 124 of controller 101 can execute program code of video conference application 105 and other applications 117 to configure communication device 100 to perform specific functions.

I/O subsystem 114 includes user interface components such as image capturing device 102, microphone 104, display device 110, touch/haptic controls 129, and audio output device(s) 131. I/O subsystem 114 also includes I/O controller 132. I/O controller 132 connects to internal devices 133, which are internal to housing 130, and to peripheral devices 134, such as external speakers, which are external to housing 130 of communication device 100. Internal devices 133 include computing, storage, communication, or sensing components depicted within housing 130. I/O controller 132 supports the necessary configuration of connectors, electrical power, communication protocols, and data buffering to act as an interface between internal devices 133 and peripheral devices 134 and other components of communication device 100 that use a different configuration for inputs and outputs.

Communication subsystem 112 of communication device 100 enables wireless communication with external communication system 135. Communication subsystem 112 includes antenna subsystem 136 having lower band antennas 137a-137m and higher band antenna arrays 138a-138n that can be attached in/at different portions of housing 130. Communication subsystem 112 includes radio frequency (RF) front end 139 and communication module 140. RF front end 139 includes transceiver(s) 141, which includes transmitter(s) 142 and receiver(s) 143. RF front end 139 further includes modem(s) 144. RF front end 139 includes antenna feed/source networks 145, antenna switch network 146, antenna impedance sensor(s) 147, and antenna matching network(s) 148. Communication module 140 of communication subsystem 112 includes baseband processor 149 that communicates with controller 101 and RF front end 139. Baseband processor 149 operates in a baseband frequency range to encode data for transmission and decode received data, according to a communication protocol. Modem(s) 144 modulate baseband encoded data from communication module 140 onto a carrier signal to provide a transmit signal that is amplified by transmitter(s) 142. Modem(s) 144 demodulates each signal received from external communication system 135 detected by antenna subsystem 136. The received signal is amplified and filtered by receiver(s) 143, which demodulate received encoded data from a received carrier signal. Antenna feed/source networks 145 transmits or receives from particular portions of antenna subsystem 136 and can adjust a phase between particular portions of antenna subsystem 136. Antenna switch network 146 can connect particular combinations of antennas (137a-137m, 138a-138n) to transceiver(s) 141. Controller 101 can monitor changes in antenna impedance detected by antenna impedance sensor(s) 147 for determining portions of antenna subsystem 136 that are blocked. Antenna matching network(s) 148 are connected to particular lower band antennas 137a-137m to tune impedance respectively of lower band antennas 137a-137m to match impedance of transceivers 141. Antenna matching network(s) 148 can also be used to detune the impedance of lower band antennas 137a-137m to not match the impedance of transceivers 141 to electromagnetically isolate a particular antenna.

In one or more embodiments, controller 101, via communication subsystem 112, performs multiple types of over-the-air (OTA) communication with network nodes 150 of external communication system 135. Particular network nodes 150 can be part of communication networks 151 of public land mobile networks (PLMNs) that provide connections to plain old telephone systems (POTS) 152 for voice calls and wide area networks (WANs) 153 for data sessions. WANs 153 can include Internet and other data networks. The particular network nodes 150 can be cellular "cells", base nodes, or base stations 154 that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas 137a-137m are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 150 can be access node(s) 155 that support wireless OTA communication. Communication subsystem 112 can receive OTA communication from location services such as provided by global positioning system (GPS) satellites 156. Communication subsystem 112 communicates via OTA communication channel(s) 158a with base stations 154. Communication subsystem 112 communicates via wireless communication channel(s) 158b with access node 155. In one or more particular embodiments, access node 155 supports communication using one or more IEEE 802.11 wireless local area network (WLAN) protocols. Wi-Fi is a family of wireless network protocols, based on the IEEE 802.11 family of standards, which are commonly used between user devices and network devices that provide Internet access. In one or more particular embodiments, communication subsystem 112 communicates with one or more locally networked devices 159 via wired or wireless link 158c provided by access node 155. Communication subsystem 112 receives downlink broadcast channel(s) 158d from GPS satellites 156 to obtain geospatial location information.

In one or more embodiments, controller 101, via communication subsystem 112, performs multiple types of OTA communication with local communication system 160. In one or more embodiments, local communication system 160 includes wireless headset 161 and smart watch 162 that are coupled to communication device 100 to form a personal access network (PAN). Communication subsystem 112 communicates via low power wireless communication channel(s) 158e with headset 161. Communication subsystem 112 communicates via second low power wireless communication channel(s) 158f, such as Bluetooth, with smart watch 162. In one or more particular embodiments, communication subsystem 112 communicates with second communication device(s) 107a via wireless link 158g to form an ad hoc network.

Data storage subsystem 113 of communication device 100 includes data storage device(s) 166. Controller 101 is communicatively connected, via system interlink 167, to data storage device(s) 166. Data storage subsystem 113 provides applications, program code, and stored data on nonvolatile storage that is accessible by controller 101. For example, data storage subsystem 113 can provide a selection of applications and computer data such as video conference application 105 and other application(s) 117 that use communication services. These applications can be loaded into device memory 106 for execution by controller 101. In one or more embodiments, data storage device(s) 166 can include hard disk drives (HDDs), optical disk drives, and/or solid-state drives (SSDs), etc. Data storage subsystem 113 of communication device 100 can include removable storage device(s) (RSD(s)) 169, which is received in RSD interface 170. Controller 101 is communicatively connected to RSD 169, via system interlink 167 and RSD interface 170. In one or more embodiments, RSD 169 is a non-transitory computer program product or computer readable storage device. Controller 101 can access RSD 169 or data storage device(s) 166 to provision communication device 100 with program code, such as code for video conference application 105 and other applications 117. When executed by controller 101, the program code causes or configures communication device 100 to provide the user interface functionality for video communication sessions described herein.

Controller 101 includes processor subsystem 124, which includes one or more central processing units (CPUs), depicted as data processor 172. Processor subsystem 124 can include one or more digital signal processors 173 that are integrated with data processor 172 or are communicatively coupled to data processor 172, such as baseband processor 149 of communication module 140. In one or embodiments that are not depicted, controller 101 can further include distributed processing and control components that are external to housing 130 or grouped with other components, such as I/O subsystem 114. Data processor 172 is communicatively coupled, via system interlink 167, to device memory 106. In one or more embodiments, controller 101 of communication device 100 is communicatively coupled via system interlink 167 to communication subsystem 112, data storage subsystem 113, and I/O subsystem 114. System interlink 167 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 167) are illustrated in FIG. 1, it is to be understood that more, fewer, or different interconnections may be present in other embodiments.

Controller 101 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

In one or more embodiments, I/O subsystem 114 includes network interface controller (NIC) 175 with a network connection (NC) 176 on housing 130. Network cable 177 connects NC 176 to wired area network 178. Wired area network 178 can be a local area network (LAN), a campus area network (CAN), a metropolitan area network (MAN), or a wide area network (WAN). For example, NC 176 can be an Ethernet connection. Second communication devices 107b is presented communicatively couple to wired area network 178.

Figure 2A:
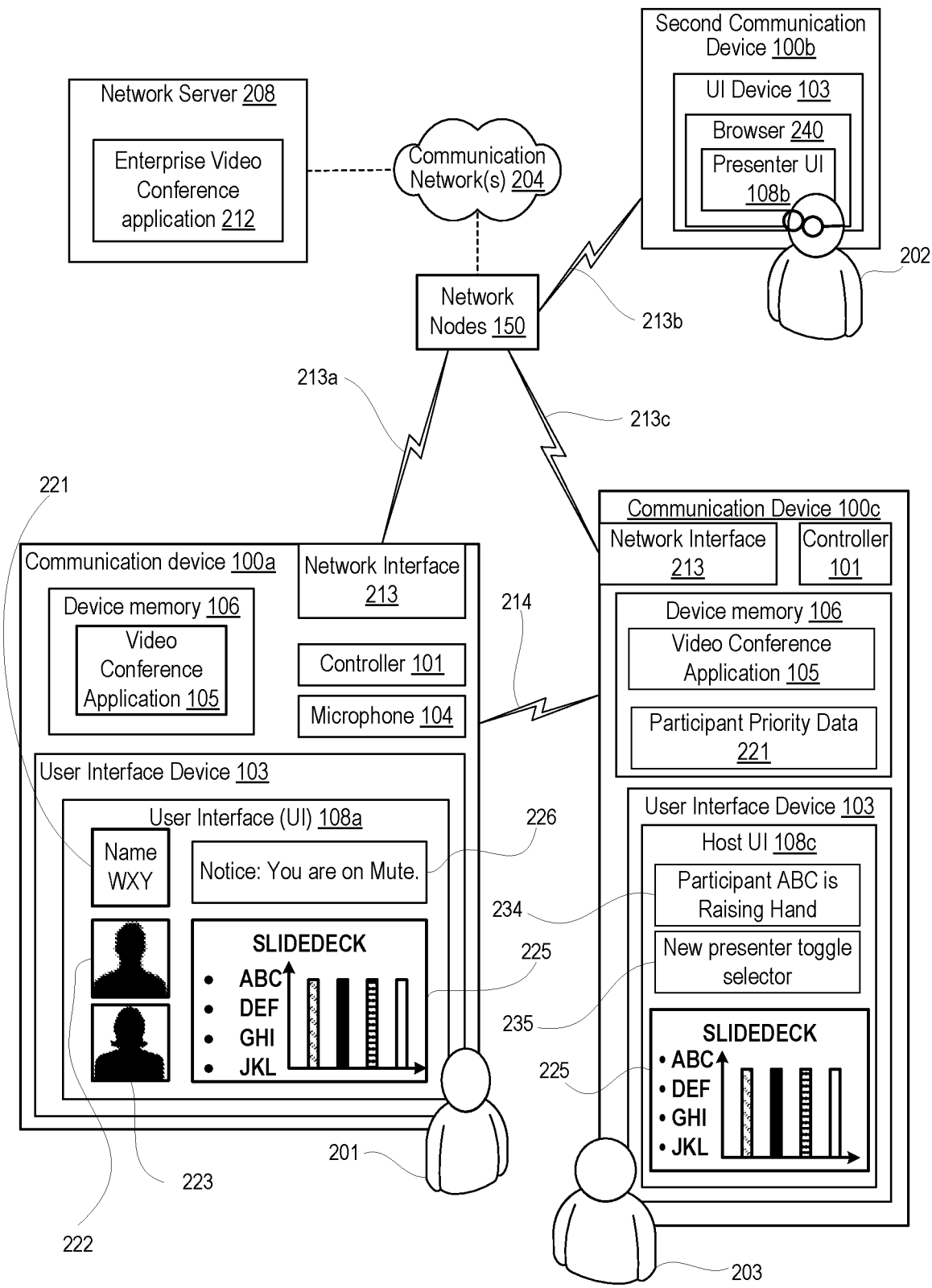
FIG. 2A depicts a functional block diagram of a communication system that supports a video communication session between two or more communication devices, according to one or more embodiments.

FIG. 2A depicts a functional block diagram of communication system 200 that supports a video communication session between first communication device 100a used by non-presenting participant 201, second communication device 100b used by presenter participant 202, and third communication device 100c used by host participant 203. First, second, and third communication devices 100a-100c are communicatively coupled via network 204 during a video communication session. In one or more embodiments, network server 208 executes enterprise video conference application 212 that facilitates setup of video conference sessions. In one or more embodiments enterprise video conference application 212 provides an interface between devices 100a-100c via communication network(s) 204. Communication devices 100a-100c, managed by respective controllers 101, connect via local network interfaces 213, to network nodes 150 via over-the-air communication channels 213a-213c. In one or more embodiments, communication devices 100a, 100c can connect via ad hoc network connection 214. Communication devices 100a, 100c each execute video conference application 105 stored in respective device memory 106 to present user interfaces 108a, 108c on respective display devices 103. Communication device 100b includes browser 240 that downloads presenter UI 108b to display locally on display device 103b.

Communication device 100a presents user interface 108a for non-presenting participant 201 to interact with. Non-presenting participant 201 is not presenting and is not acting as host. Video conference application 105 customizes user interface 108a for non-presenting participant 201. User interface 108a receives image streams 221-223 from respective image capturing devices 102 of each communication device 100a-100c. In the presented embodiment, image stream 221 includes merely the name of non-presenting participant 201 who has turned off video sharing or whose communication device 100a does not have a working image capturing device 102. User interface 108a includes screen sharing window 225 and alert 226 that indicates that microphone 104 is muted. While monitoring the image stream, video conference application 105 detects an attempt by non-presenting participant 201 to actively participate in the video communication session by speaking.

Host participant 203 interacts with host user interface 108c that can be customized for a participant that has greater control over the video communication session based on participant priority data 221 associated with each participant 201-203. User interface 108c includes screen sharing window 225 that could be controlled by any of communication device 100a, communication device 100b or communication device 100c. Alert window 234 can provide indications of participants that are attempting to speak, allowing communication device 100c to assist communication device 100b by having host presenter 203 inform participants when their respective device is muted. User interface 108c can present alert window 234 in response to a gesture or an identified movement of mouth of non-presenting participant 201 captured within a video stream from non-presenting participant's communication device 100c. User interface 108c can present new presenter toggle selector 235 along with alert window 234 in response to the determination, identification, or notification that non-presenting participant 201 is attempting to speak to other participants (202-203) in the video communication session. New presenter toggle selector 235 enables host toggling of non-presenting participant 201 to become a presenting participant. The host toggling of new presenter toggle selector 235 selects an output of the video stream of the non-presenting participant 201 and a corresponding audio stream to present to the video communication session. In one embodiment, new presenter toggle selector 225 is presented UI 108c and is highlighted or otherwise made more visible within UI 108c concurrently with the presentation of alert window 234.

Figure 3A:
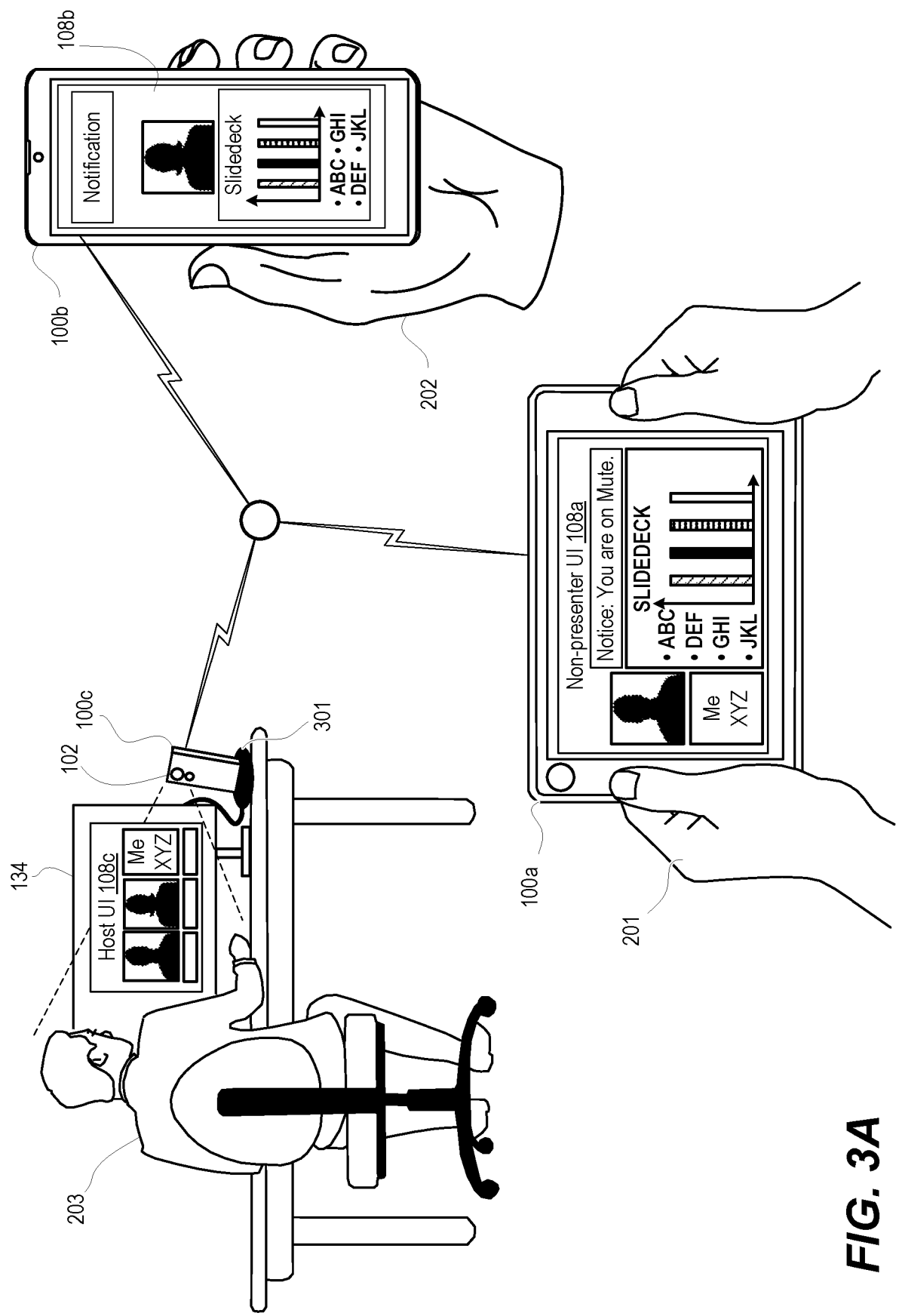
FIG. 3A depicts a front view of host, presenter, and non-presenter communication devices respectively presenting a host user interface, a presenter user interface, and a non-presenter user interface for a video communication session, according to one or more embodiments.

FIG. 3A depicts a front view of three communication devices 100a-100c presenting user interfaces 108a-108c respectively tailored to a current role being played by non-presenting participant 201, presenting participant 202, and host participant 203 for a video communication session. Each of communication devices 100a-100c can be of different types, having some or all of the components of communication device 100 (FIG. 1) in different form factors. In the presented example, communication device 100a is a tablet. In one or more embodiments, communication device 100b is a smart phone. Communication device 100c can be a mobile communication device, such as a smart phone, that includes user interface device 103 that presents presenter UI 108b. Communication device 100c can be a mobile communication device, such as a smart phone in dock 301 that is communicatively coupled to a peripheral device 134 (FIG. 1). In one or more embodiments, peripheral device 134 is a monitor of desktop workstation.

Figure 2B:
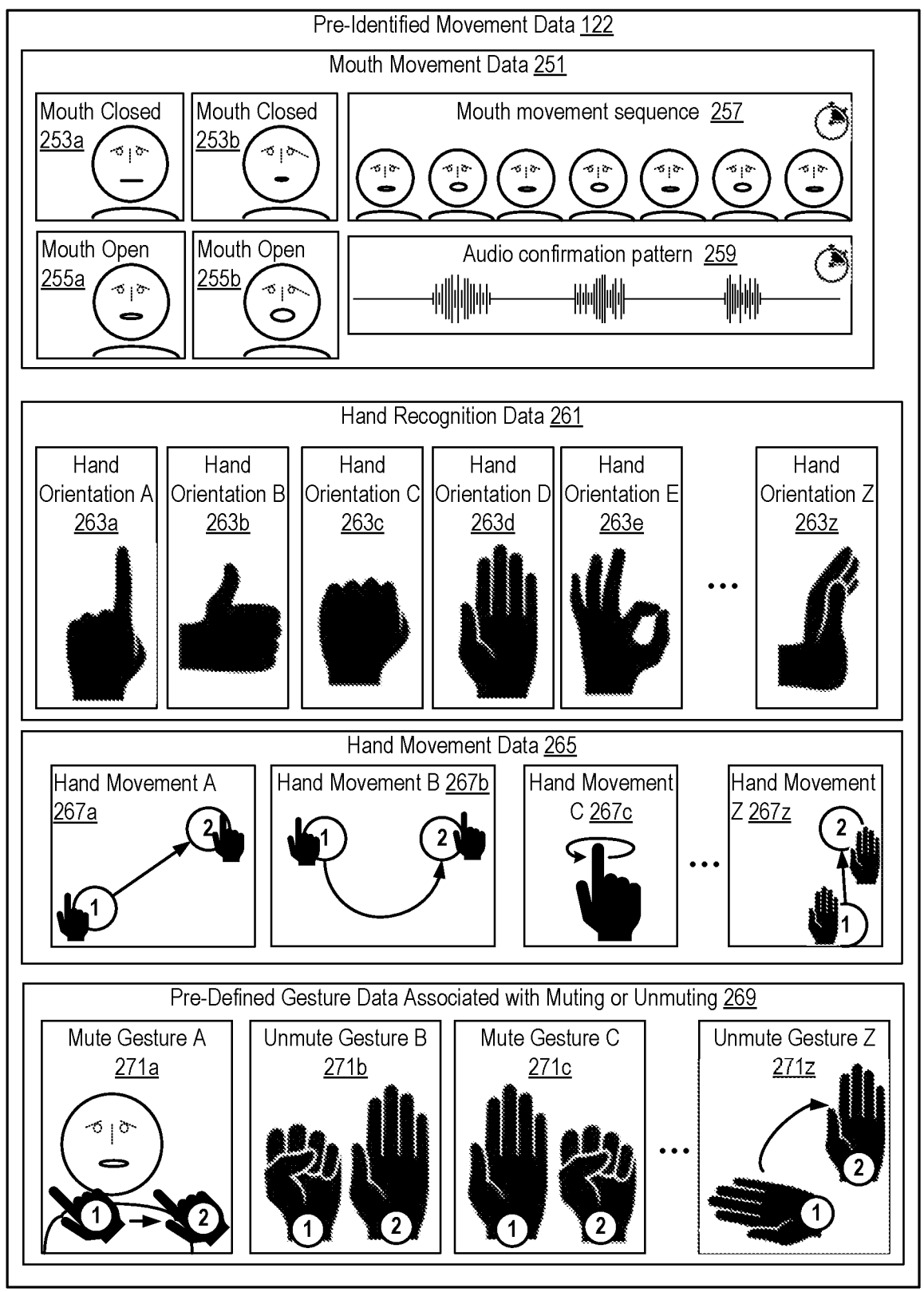
FIG. 2B depicts a diagram of pre-defined movement data stored in memory of the communication device of FIG. 1, according to one or more embodiments.

FIG. 2B depicts a diagram of example pre-defined movement data 122 stored in device memory 106 of host communication device 100c (FIG. 2A). In an example, pre-defined movement data 122 can include mouth movement data 251. Mouth movement data 251 can include first and second mouth closed recognition images 253a-253b that depict a closed mouth that can be compared to a live stream image. Pre-defined movement data 122 can include first and second mouth open recognition images 255a-255b that depict an opened mouth that can be compared to the live stream image. Mouth movement sequence 257 defines a minimum number of opening and closing of the mouth during a defined time period that indicates speaking. In one or more embodiments, audio confirmation pattern 259, if available, can be matched to the mouth movement sequence 257 to confirm an attempt to speak by non-presenting participant 201 (FIG. 2A).

Pre-defined movement data 122 can include hand recognition data 261 that can be compared to the image stream to recognize that one or both hands of non-presenting participant 201 are visible within the image stream. In an example, hand orientation A 263a depicts an index finger extended from a left hand. Hand orientation B 263b depicts only a thumb extended from a right hand. Hand orientation C 263c depicts a clenched left fist. Hand orientation D 263d depicts an open left hand. Hand orientation E 263e depicts only left hand making an "OK". Hand orientation Z 263z depicts only thumb-side view of an open left hand.

Pre-defined movement data 122 can include hand movement data 265 that can be compared to the image stream to recognize directional movement(s) of one or both hands of non-presenting participant 201. In an example, hand movement A 267a depicts a hand moving diagonally upward and laterally. Hand movement B 267b depicts a hand moving laterally in a U-shaped curve. Hand movement C 267c depicts an index finger making a twirling motion. Hand movement Z 267z depicts one hand moving upward.

Pre-defined movement data 122 can include pre-defined gesture data 269 that are associated with automatic muting, automatic unmuting, or toggling between muting and unmuting. In an example, mute gesture A 271a describes a slashing motion of an index finger in front of a neck of non-presenting participant 201 (FIG. 2A). Unmute gesture B 271b describes a clenched first unclenching to an open hand. Mute gesture C 271c describes an open hand clenching to a fist. Unmute gesture 271z describes palm out open hand swept in a 90° arc.

Pre-defined movement data 122 can further include rule-based filtering of gesturing. As an example, a gesture that last less than a first threshold period of time, such as two (2) seconds, can be ignored as not being associated with an attempt to speak. As another example, an open hand positioned over the mouth, such as in response to a yawn or a sneeze, can be ignored as not being associated with an attempt to speak. As an additional example, a finger scratching a portion of the face can be ignored as not being associated with an attempt to speak. As a further example, holding up a hand for more than a second threshold of time, such as seven (7) seconds, can be associated with an attempt to speak.

Figure 3B:
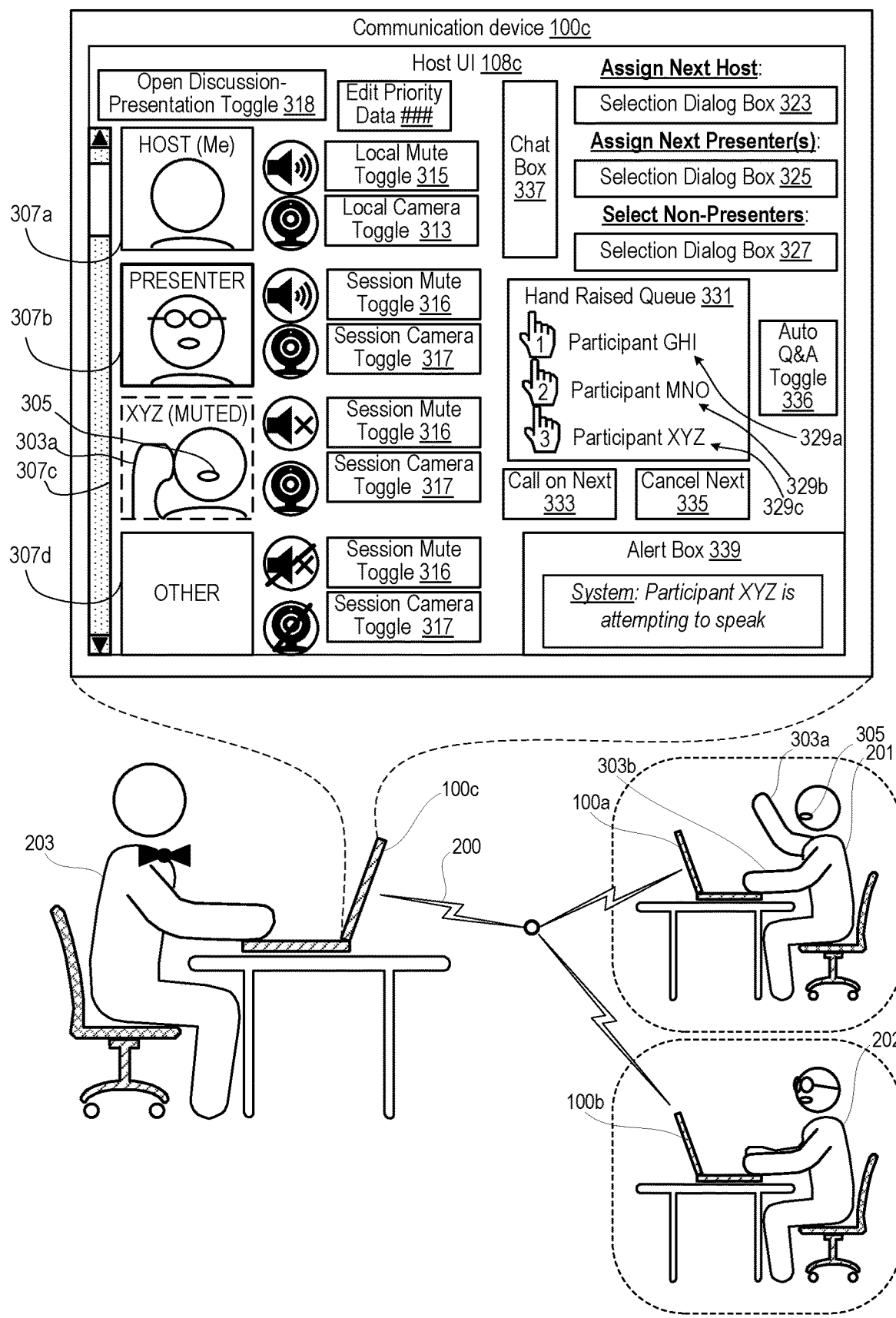
FIG. 3B depicts features of a host user interface of the host communication device of FIG. 3A, according to one or more embodiments.

FIG. 3B depicts a host user interface 108c presented on communication device 100c and used by host participant 203 during the video communication session. Communication system 200 communicatively couples communication device 100a used by non-presenting participant 201 and communication device 100b used by presenting participant 202 to communication device 100c. In one or more embodiments, an electronic device, such as communication device 100c, is remote to communication device 100a that is used by non-presenting participant 201. Communication device 100c visually monitors movements by non-presenting participant 201 that indicate an attempt by or desire of a non-presenting participant to speak to other participants (202-203). In an example, the electronic device is remote to communication device 100a. The electronic device receives and monitors an image stream from communication device 100a. The electronic device can be network server 210 (FIG. 2A), communication device 100b, communication device 100c, or another electronic device that autonomously operates in support of the communication session. In an example, two or more electronic devices distribute receiving and monitoring of image streams from remote communication devices 100a and 100c. Detection of a non-presenting participant 201 attempting to speak is based on movements of one or more hands 303a-303b or based on movement of mouth 305 of non-presenting participant 201. An electronic device such as communication device 100b that detects the movements within the received video stream can send an alert to one or more of communication devices 100a-100b. For clarity, the present disclosure includes alerting the presenting participant 202 in one or more ways that can unobtrusively prompt presenting participant 202 to make a decision to allow or ignore the attempt to speak by non-presenting participant 201. The alerts seek to inform, without degrading the user experience in participating in the communication session.

In one or more embodiments, presenter user interface 108c can present local image stream as video inset box 307a and can present one or more received and monitored remote image streams as video inset boxes 307b-307d. In one or more embodiments, the number of participants can exceed available display locations to present all remote image streams. Audio inputs received from the respective remote image streams can automatically prioritize particular video inset boxes to display. According to aspects of the present disclosure, movement of hands 303a-303b or mouth 305 by non-presenting participant 201 can prioritize presentation of video inset box 307c for non-presenting participant 201 even though non-presenting participant 201 is locally hard muted and is not providing audio input to the other communication devices 100b-100c. Moving video inset box 307c can serve as an alert to host participant 203 or presenting participant 202.

Host user interface 108c includes camera toggle button 313 to locally turn off image capturing device 102 (FIG. 1) of communication device 100b. Host user interface 108c includes mute button 315 to locally turn off microphone 104 (FIG. 1) of communication device 100b. Host participant 203 can also individually toggle a session mute toggle button 316 or toggle a session camera toggle button 317 for each participant. Host user interface 108c can also include open discussion-presentation toggle button 318 to either globally unmute all electronic device to allow everyone to speak or to mute all electronic devices that are not designated as presenting. A selection dialog box 323 for assigning a next host allows designation of another participant to take over as host. Selection dialog box 325 is utilized for assigning a next presenter or more than one presenter. Selection dialog box 327 is utilized for assigning designation of other participants to be non-presenters.

In one or more embodiments, user interface 108c can include alternate visual tools to communicate with other participants, such an enabling selections to "raise hand", which adds participant to hand raised indications 329a-329c within hand raised queue 331. User interfaces 108a-108b (FIG. 3A) can similarly include alternate visual tools to communicate with other participants, such an enabling selections to "raise hand", which adds a respective one of hand raised indications 329a-329c corresponding to participant to hand raised queue 331. For example, call on next button 333 can automatically designate the next participant in the hand raised queue 331 to speak. In one or more embodiments, call on next button 333 triggers an unmuting of a soft mute status and alerting the designated participant. Host participant 203 can also select cancel next button 335 to clear one or more hand raised indications 329a-329c. Automatic question and answer toggle button 336 enables automatic designation of each participant in the hand raised queue 331 without having to activate call on next button 333.

Participants 201-203 can also use chat box 337 to send text messages to some or all of other participants 201-203. Automated alert of a detected attempt by non-presenting participant 201 to speak can be provided via chat box 337. In addition to detecting an inadvertent "speaking while muted" scenario, non-presenting participant 201 can also intentionally use the automatic visual detection as an intuitive and expeditious way to get the attention of presenting participant 202. Non-presenting participant 201 can make movements that will cause one or more alerts to be generated and presented. Pop-up alert box 339 can provide an automatic alert that non-presenting participant 201 is attempting to speak.

FIGS. 4A-4D (FIG. 4) present a flow diagram of a method for managing, by an electronic device such as communication device 100 (FIG. 1), a video communication session and responding to remote participants attempting to speak while their respective device is muted to reduce loss of communication between participants. In at least one embodiment, communication device 100, managed by controller 101, executes video conference application 105 (FIG. 1) to facilitate the communication session. In one or more embodiments, video conference application 105 (FIG. 1) is implemented by browser 240 (FIG. 2A). Browser 240 is executed by controller 101. Some functionality of the communication session can be executed by network server 208 (FIG. 2A). The description of method 400 is provided with general reference to the specific components illustrated within the preceding FIGS. 1, 2A-2B and 3A-3B, and specific components referenced in method 400 can be identical or similar to components of the same name used in describing preceding FIGS. 1, 2A-2B and 3A-3B.

Figure 4A:
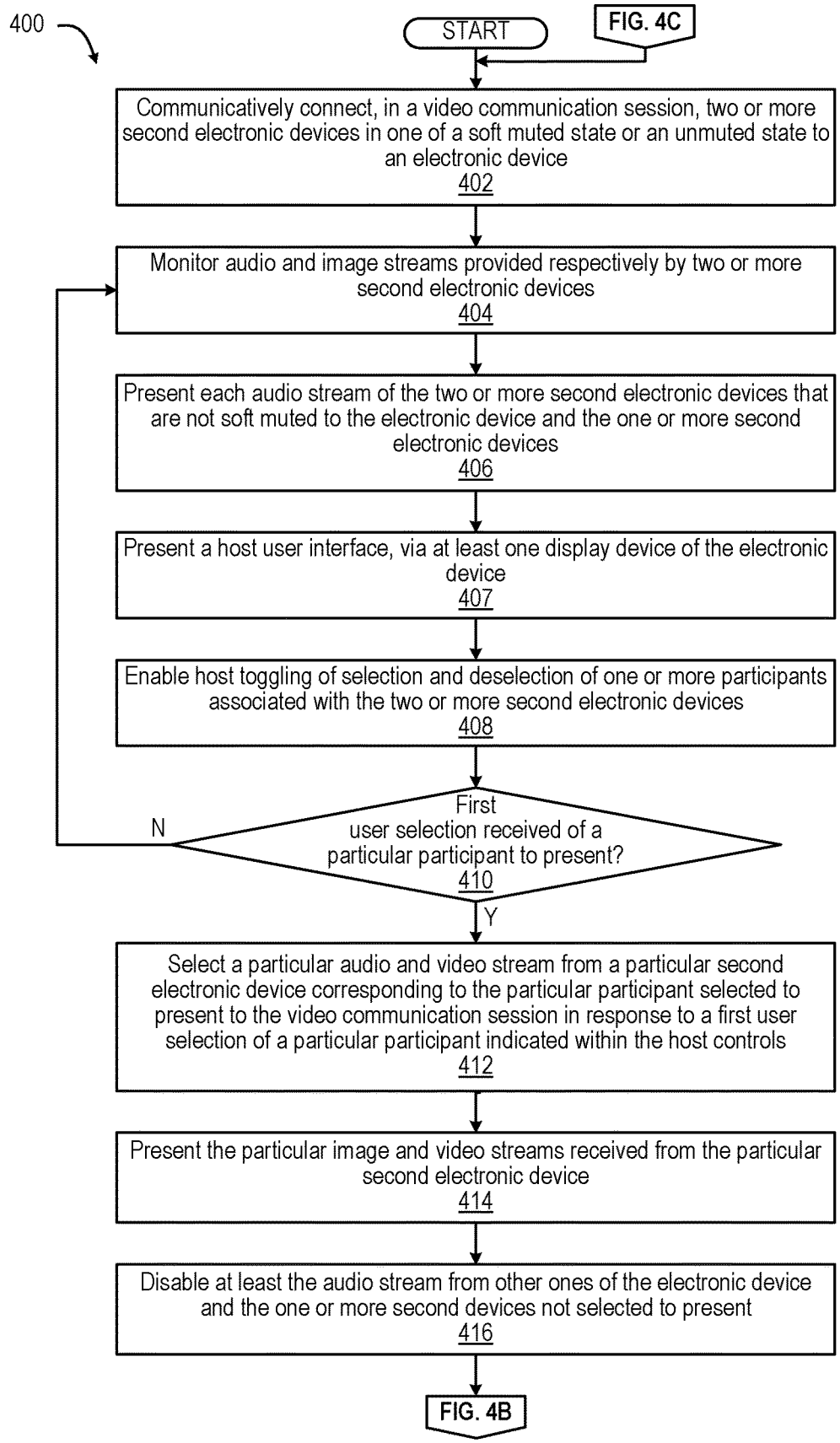
FIGS. 4A-4D (FIG. 4) present a flow diagram of a method for managing a video communication session by a host user interface that is responsive to remote participants attempting to speak while their respective device is muted, according to one or more embodiments.

With reference to FIG. 4A, method 400 includes communicatively connecting, in a video communication session, two or more second electronic devices in one of a soft muted state or an unmuted state to an electronic device (block 402). Method 400 includes monitoring audio and image streams provided respectively by two or more second electronic devices (block 404). Method 400 includes presenting each audio stream of the two or more second electronic devices that are not soft muted to the electronic device and the one or more second electronic devices (block 406). Method 400 includes presenting a host user interface, via at least one display device of the electronic device (block 407). Method 400 includes enabling host toggling of selection (and deselection) of one or more participants associated with the two or more second electronic devices (block 408). The selection enables the respective second electronic device to present a corresponding audio and video stream to the video communication session. The host user interface enables host toggling of the one or more participants individually or in groups. In one or more embodiments, the host toggling is performed granularly, in response to the first user selection of a corresponding participant indicated within the host controls while a presenter selection function is active. Method 400 includes determining whether a first user selection of a particular participant is received, within the host controls, to present to the video communication session (decision block 410). In response to not receiving the first user selection, method 400 returns to block 404. In response to receiving the first user selection, method 400 includes selecting a particular audio and video stream from a particular second electronic device corresponding to the particular participant selected to present to the video communication session (block 412). Method 400 includes presenting the particular image and video streams received from the particular second electronic device (block 414). Method 400 includes disabling at least the audio stream from the electronic device and other ones of the one or more second devices not selected to present (block 416).

Figure 4B:
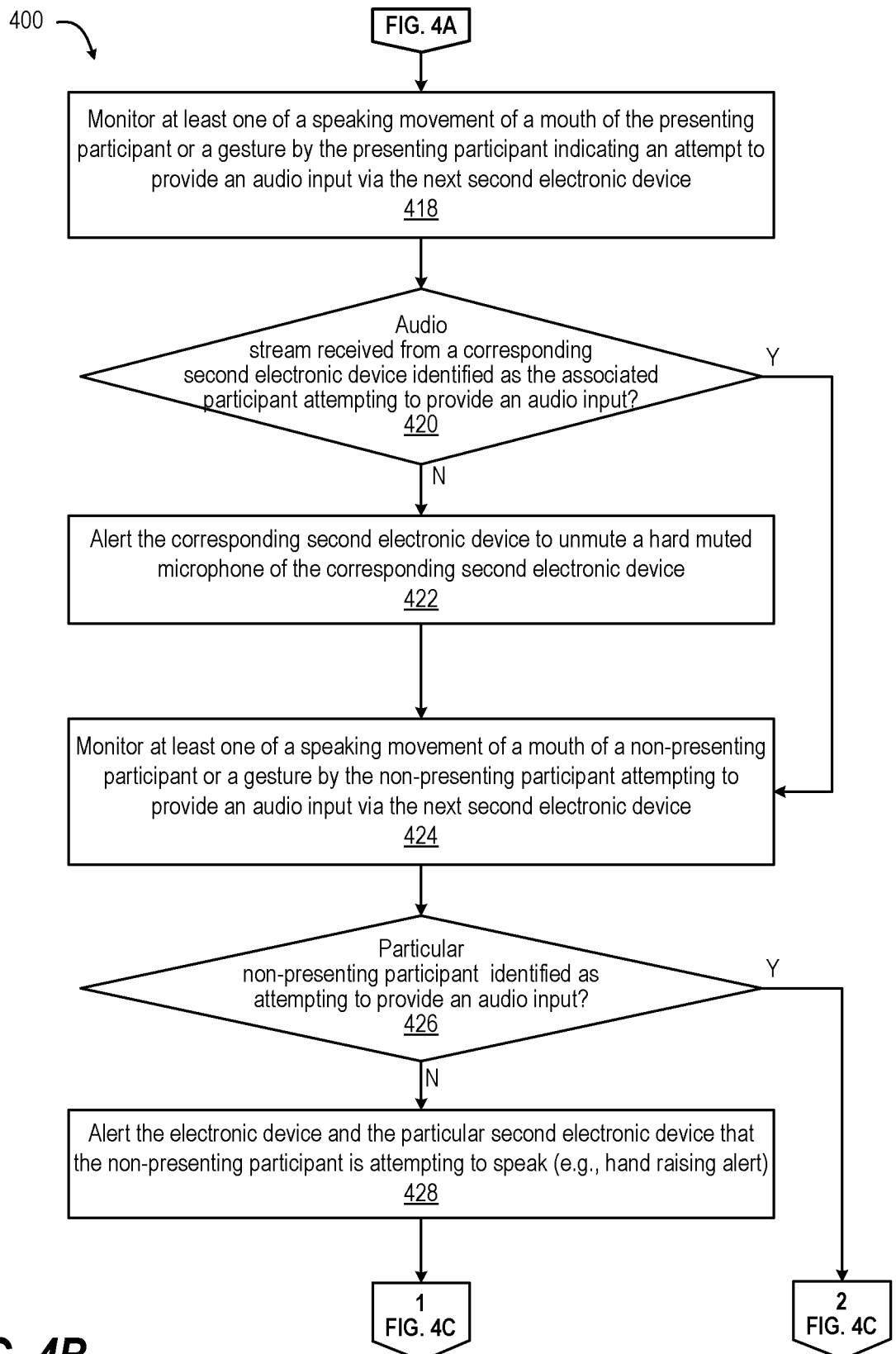

With reference to FIG. 4B, method 400 includes monitoring, within an image stream from one or more designated second electronic devices that is currently designated to present to the video communication session, at least one of a speaking movement of a mouth of the presenting participant or a gesture by the presenting participant indicating an attempt to provide an audio input via the next second electronic device (block 418). Method 400 includes determining whether an audio stream is not being received from a corresponding second electronic device that is identified as associated with the participant attempting to provide an audio input (decision block 420). In response to determining that an audio stream is not being received from a corresponding second electronic device that is identified as attempting to provide an audio input, method 400 includes alerting the corresponding second electronic device to unmute a hard-muted microphone of the corresponding second electronic device (block 422). Method 400 includes monitoring, within an image stream from the one or more second electronic devices that is not currently selected to present to the video communication session, at least one of a speaking movement of a mouth of a non-presenting participant or a gesture by the non-presenting participant attempting to provide an audio input via the next second electronic device (block 424). In response to determining in decision block 420 that an audio stream is being received from a corresponding second electronic device that is identified as attempting to provide an audio input, method 400 proceeds to block 424. Method 400 includes determining whether a particular non-presenting participant using a particular second electronic device is identified as attempting to provide an audio input (decision block 426). In response to determining that a particular non-presenting participant using a particular second electronic device is identified as attempting to provide an audio input, method 400 includes alerting the electronic device and the particular second electronic device that the non-presenting participant is attempting to speak (e.g., hand raising alert) (block 428). Then, method 400 transitions to block 430 of FIG. 4C. From the no output of decision block 426, method 400 moves to block 436 of FIG. 4C.

Figure 4C:
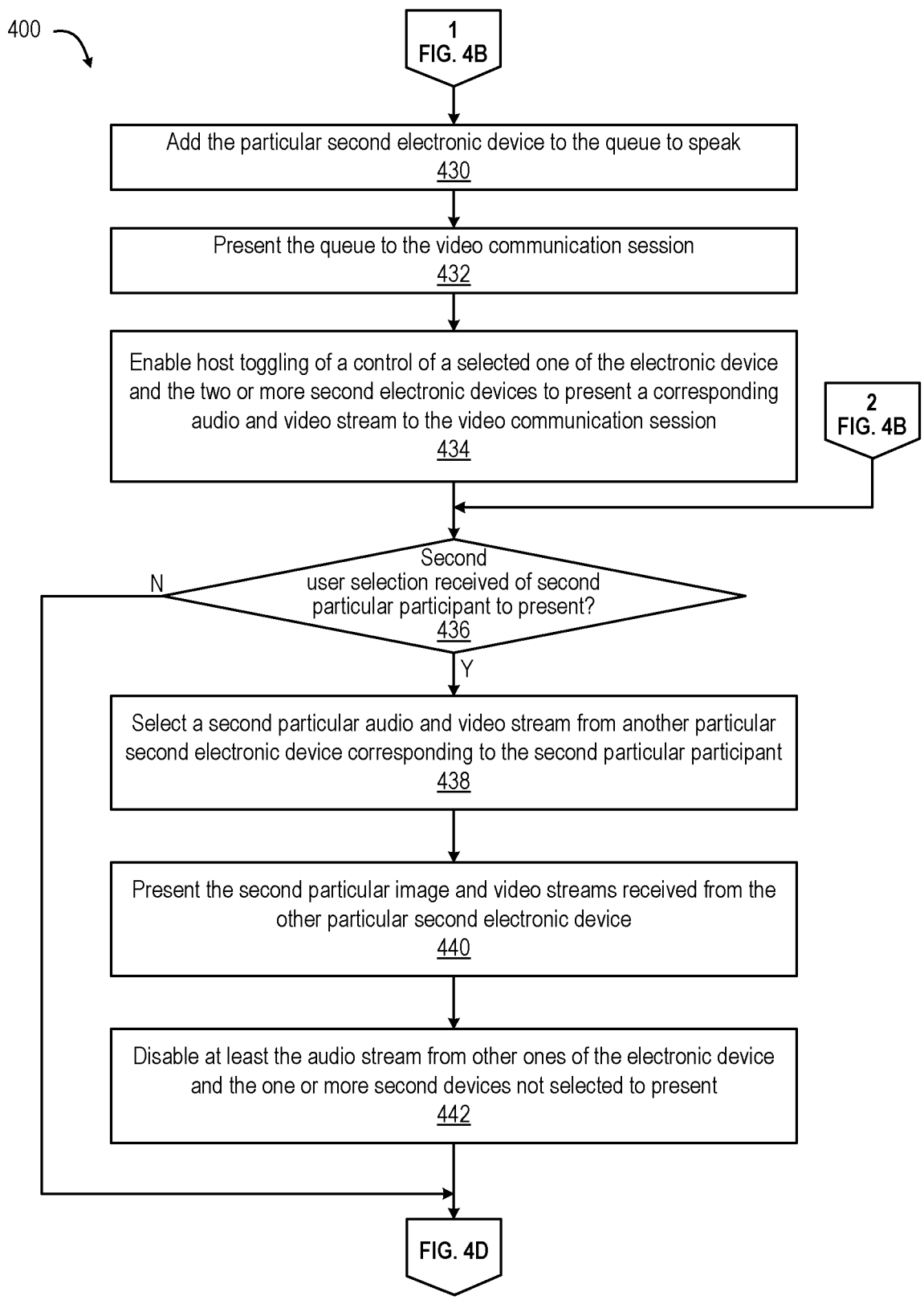

With reference to FIG. 4C, method 400 includes adding the particular second electronic device to the queue to speak (block 430). Method 400 includes presenting the queue to the video communication session (block 432). Method 400 includes enabling host toggling via a control from within the host user interface, of a selected one of the electronic device and the two or more second electronic devices to present a corresponding audio and video stream to the video communication session (block 434). As an example, the host participant can respond to an alert by selecting the non-presenting participant who is attempting to speak to be a presenting participating, which toggles the soft muted status to unmuted. In an example, the alert may be an entry on hand raised queue 339 (FIG. 3B). In another example, the alert may be alert box 331 (FIG. 3B). Method 400 includes determining whether a second user selection is received of a second particular participant indicated within the host controls to present corresponding audio and video of the second particular participant to the video communication session (decision block 436).

Returning briefly to decision block 426 of FIG. 4B, in response to not detecting in any particular non-presenting participant attempting to provide an audio input, method 400 also proceeds to 436. From block 436 in response to receiving the second user selection, method 400 includes selecting a second particular audio and video stream from another particular second electronic device corresponding to the selected second particular participant (block 438). Method 400 includes presenting the second particular image and video streams received from the second electronic device of the selected second particular participant (block 440). Method 400 includes disabling at least the audio stream from the electronic device and other ones of the one or more second electronic devices that are not the second electronic device of the selected second particular participant (block 442). Then method 400 proceeds to decision block 444 (FIG. 4D).

Figure 4D:
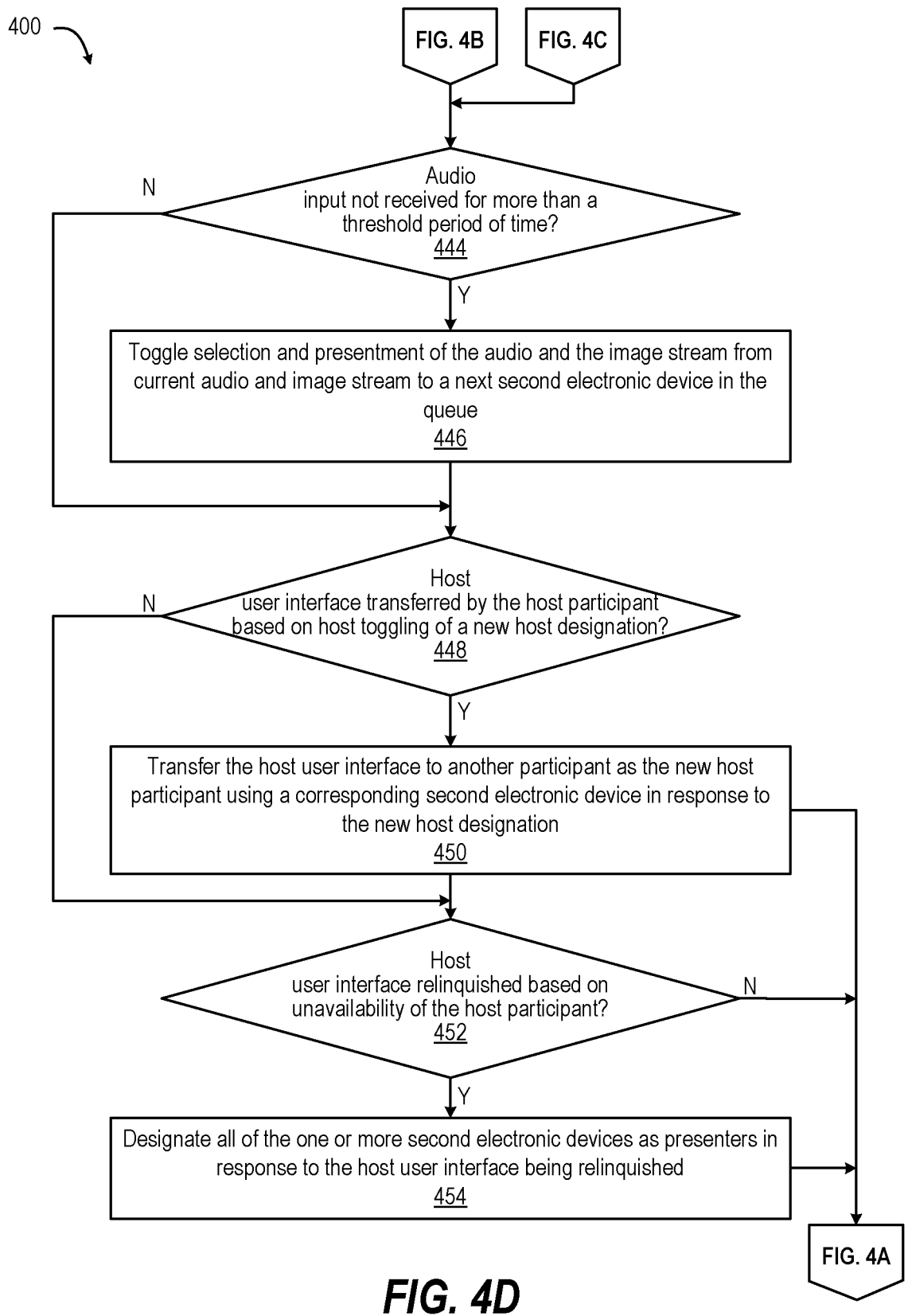

In response to not receiving the second user selection in decision block 436 (FIG. 4C), method 400 proceeds to decision block 444 (FIG. 4D). Referring to FIG. 4D, method 400 includes determining whether audio input has not been received for more than a threshold period of time (decision block 444). The lack of audio input indicates that the particular participant has stopped presenting. In response to identifying that the particular participant has ceased presenting for more than the threshold period of time, method 400 includes toggling selection and presenting of the audio and the image stream from current audio and image stream to a next second electronic device in the queue (block 446). The toggling enables the next non-presenting participant associated with the next second electronic device to become a new presenting participant.

In response to not identifying that the particular participant has ceased presenting for more than the threshold period of time in decision block 444, method 400 also proceeds to decision block 448. Method 400 includes determining, at decision block 448, whether the host user interface has been transferred by the host participant, based on host toggling of a new host designation. In response to determining that the host user interface has been transferred by the host participant, method 400 includes transferring the host user interface to another participant as the new host participant using a corresponding second electronic device (block 450). Then method 400 returns to block 402 (FIG. 4A).

In response to determining that the host user interface has not been transferred by the host participant based on host toggling of a new host designation in decision block 448, method 400 also proceed to decision block 452. At decision block 452, method 400 includes determining whether the host user interface has been relinquished by the host participant based on unavailability of the host participant. In response to determining that the host user interface has been relinquished by the host participant based on unavailability of the host participant, method 400 includes designating all of the one or more second electronic devices as presenters (block 454). Then method 400 returns to block 402 (FIG. 4A). In response to determining that the host user interface has not been relinquished by the host participant in decision block 452, method 400 also returns to block 402 (FIG. 4A).

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   at least one audio output device;
   at least one user interface device comprising at least one display device;
   a network interface that enables the electronic device to communicatively communicate in a video communication session with two or more second electronic devices and which receives one or more image streams during the video communication session; and a controller communicatively coupled to the at least one audio output device, the network interface device, and the at least one user interface device, and which controls the electronic device to:
- monitor, at the electronic device, audio and image streams provided respectively by the two or more second electronic devices that are communicatively connected to the electronic device in the video communication session;
- present a host user interface via the at least one display device that comprises host controls for the video communication session;
- in response to a first user selection of a particular participant indicated within the host controls, select a particular audio and video stream from a particular second electronic device corresponding to the particular participant selected to present to the video communication session;
- present, in response to an identified movement of a non-presenting participant's mouth or a gesture captured within a video stream from the non-presenting participant, a new presenter toggle selector along with an alert via the host user interface that the non-presenting participant is attempting to speak to other participants in the video communication session; and
- enable host toggling, via the new presenter toggle selector from within the host user interface, of the non-presenting participant to become a presenting participant, the host toggling selecting an output of the video stream and a corresponding audio stream to present to the video communication session;
- determines that the host user interface has been relinquished by the host participant based on one of the host toggling of the host user interface and unavailability of the host participant; and
- designates all of the one or more second electronic devices as presenters in response to the host user interface being relinquished.

2. The electronic device of claim 1, wherein the controller:
- determines that the host user interface has been transferred by the host participant based on one of a host toggling of a new host designation; and
- transfers the host user interface to another participant as the new host participant using a corresponding second electronic device in response to the new host designation.

3. The electronic device of claim 1, wherein the controller transmits a hand raised alert to the particular second electronic device in response to the identified speaking movement or the gesture to inform the particular participant that is presenting that another participant desires to speak.

4. The electronic device of claim 1, wherein the controller:
- identifies, based on a non-receipt of audio input for more than a threshold period of time, that the particular participant has stopped presenting; and
- in response to identifying that the particular participant has ceased presenting for more than the threshold period of time:
  - identifies that an image stream from a next second electronic device contains a speaking movement or gesture; and
  - selects and presents the audio and the image stream from the next, second electronic device, enabling the non-presenting participant to become a new presenting participant, in response to identifying the speaking movement or the gesture.

5. The electronic device of claim 1, wherein the controller:
- enables host toggling, from within the host user interface, of a selected one or more of the participants associated with the electronic device and the two or more second electronic devices to be able to present a corresponding audio and video stream to the video communication session, the toggling granularly performed in response to the first user selection of a corresponding participant indicated within the host controls while a presenter selection function is active.

6. The electronic device of claim 1, wherein the controller:
- enables host toggling, from within the host user interface, of a selected one or more of the two or more second electronic devices as non-presenters to prevent transmission of a corresponding audio and/or video stream to the video communication session; and
- identifies, within the image stream from each one of the two or more second electronic devices that is associated with a non-presenting participant, when a respective, corresponding participant is attempting to speak to other participants in the video communication session in response to the identified speaking movement or the gesture.

7. The electronic device of claim 6, wherein the controller:
- monitors for an indication that more than one participant associated with the one or more second electronic devices selected as a non-presenter are attempting to speak to other participants during the communication session; and
- in response to receiving the indication:
  - queues the respective second electronic devices to present an associated audio and video input stream to the video communication session based on a position in the queue;
  - presents the queue to the participants in the video communication session via the corresponding one or more second electronic devices; and
  - alerts each of the respective second electronic devices when that second electronic device is at a top of the queue and enables presentation of the associated audio and video input stream of that second electronic device within the video communication session.

8. The electronic device of claim 6, wherein the controller:
- identifies that a specific one of the two or more particular second electronic devices selected as a presenter is not providing an audio stream, indicating being locally muted at the specific one of the two or more particular second electronic devices;
- monitors for an indication from the corresponding image stream that the corresponding presenter is attempting to speak to other participants during the communication session; and
- presents an alert via the host user interface that the presenting participant is attempting to speak to other participants in the video communication session.

9. A method comprising:
- monitoring, at an electronic device, audio and image streams provided respectively by two or more second electronic devices that are communicatively connected to the electronic device in a video communication session;

presenting a host user interface via at least one display device of the electronic device that comprises host controls for the video communication session between the electronic device and the two or more second electronic devices;

in response to a first user selection of a particular participant indicated within the host controls, selecting a particular audio and video stream from a particular second electronic device corresponding to the particular participant selected to present to the video communication session;

presenting, in response to an identified movement of a non-presenting participant's mouth or a gesture captured within a video stream from the non-presenting participant, a new presenter toggle selector along with an alert via the host user interface that the non-presenting participant is attempting to speak to other participants in the video communication session;

enabling host toggling, via the new presenter toggle selector from within the host user interface, of the non-presenting participant to become a presenting participant, the host toggling selecting an output of the video stream and a corresponding audio stream to present to the video communication session;

determining that the host user interface has been relinquished by the host participant based on one of a host toggling of the host user interface and unavailability of the host participant; and designating all of the one or more second electronic devices as presenters in response to the host user interface being relinquished.

10. The method of claim 9, further comprising:
determining that the host user interface has been transferred by the host participant based on one of a host toggling of a new host designation; and
transferring the host user interface to another participant as the new host participant using a corresponding second electronic device in response to the new host designation.

11. The method of claim 9, further comprising transmitting a hand raised alert to the particular second electronic device in response to the identified speaking movement or the gesture to inform the particular participant that is presenting that another participant desires to speak.

12. The method of claim 9, further comprising:
identifying, based on a non-receipt of audio input for more than a threshold period of time, that the particular participant has stopped presenting; and
in response to identifying that the particular participant has ceased presenting for more than the threshold period of time:
identifying that an image stream from a next second electronic device contains a speaking movement or gesture; and
selecting and presenting the audio and the image stream from the next, second electronic device, enabling the non-presenting participant to become a new presenting participant, in response to identifying the speaking movement or the gesture.

13. The method of claim 9, further comprising:
enabling host toggling, from within the host user interface, of a selected one or more of the participants associated with the electronic device and the two or more second electronic devices to be able to present a corresponding audio and video stream to the video communication session, the toggling granularly performed in response to the first user selection of a corresponding participant indicated within the host controls while a presenter selection function is active.

14. The method of claim 9, further comprising:
enabling host toggling, from within the host user interface, of a selected one or more of the two or more second electronic devices as non-presenters to prevent transmission of a corresponding audio and/or video stream to the video communication session; and
identifies, within the image stream from each one of the two or more second electronic devices that is associated with a non-presenting participant, when a respective, corresponding participant is attempting to speak to other participants in the video communication session in response to the identified speaking movement or the gesture.

15. The method of claim 14, further comprising:
monitoring for an indication that more than one participant associated with the one or more second electronic devices selected as a non-presenter are attempting to speak to other participants during the communication session; and
in response to receiving the indication:
queueing the respective second electronic devices to present an associated audio and video input stream to the video communication session based on a position in the queue; and
presenting the queue to the participants in the video communication session via the corresponding one or more second electronic devices; and
alerting each of the respective second electronic devices when that second electronic device is at a top of the queue and enabling presentation of the associated audio and video input stream of that second electronic device within the video communication session.

16. The method of claim 14, further comprising:
identifying that a specific one of the two or more particular second electronic devices selected as a presenter is not providing an audio stream, indicating being locally muted at the specific one of the two or more particular second electronic devices;
monitoring for an indication from the corresponding image stream that the corresponding presenter is attempting to speak to other participants during the communication session; and
presenting an alert via the host user interface that the presenting participant is attempting to speak to other participants in the video communication session.

17. A computer program product comprising:
a computer readable storage device; and
program code on the computer readable storage device that when executed by a processor associated with an electronic device, the program code enables the electronic device to provide the functionality of:
monitoring, at the electronic device, audio and image streams provided respectively by two or more second electronic devices that are communicatively connected to the electronic device in a video communication session;
presenting a host user interface via at least one display device of the electronic device that comprises host controls for the video communication session between the electronic device and the two or more second electronic devices;

in response to a first user selection of a particular participant indicated within the host controls, selecting a particular audio and video stream from a particular second electronic device corresponding to the particular participant selected to present to the video communication session;

presenting, in response to an identified movement of a non-presenting participant's mouth or a gesture captured within a video stream from the non-presenting participant, a new presenter toggle selector along with an alert via the host user interface that the non-presenting participant is attempting to speak to other participants in the video communication session;

enabling host toggling, via the new presenter toggle selector from within the host user interface, of the non-presenting participant to become a presenting participant, the host toggling selecting an output of the video stream and a corresponding audio stream to present to the video communication session;

determining that the host user interface has been relinquished by the host participant based on one of a host toggling of the host user interface and unavailability of the host participant; and designating all of the one or more second electronic devices as presenters in response to the host user interface being relinquished.

18. The computer program product of claim 17, wherein the program code enables the electronic device to provide the functionality of:

determining that the host user interface has been transferred by the host participant based on one of a host toggling of a new host designation; and transferring the host user interface to another participant as the new host participant using a corresponding second electronic device in response to the new host designation.

19. The computer program product of claim 17, wherein the program code enables the electronic device to provide the functionality of transmitting a hand raised alert to the particular second electronic device in response to the identified speaking movement or the gesture to inform the particular participant that is presenting that another participant desires to speak.

20. The computer program product of claim 17, wherein the program code enables the electronic device to provide the functionality of identifying, based on a non-receipt of audio input for more than a threshold period of time, that the particular participant has stopped presenting; and in response to identifying that the particular participant has ceased presenting for more than the threshold period of time:

identifying that an image stream from a next second electronic device contains a speaking movement or gesture; and selecting and presenting the audio and the image stream from the next, second electronic device, enabling the non-presenting participant to become a new presenting participant, in response to identifying the speaking movement or the gesture.

* * * * *